United States Patent
Carlsson Bohm et al.

(10) Patent No.: US 11,542,979 B2
(45) Date of Patent: Jan. 3, 2023

(54) SEAL ARRANGEMENT, KIT OF PARTS AND METHOD

(71) Applicant: ABB Schweiz AG, Baden (CH)

(72) Inventors: Henrik Carlsson Bohm, Västerås (SE); Mats Olsson, Västerås (SE); Stefan Danielsson, Västerås (SE)

(73) Assignee: ABB Schweiz AG, Baden (CH)

( * ) Notice: Subject to any disclaimer, the term of this patent is extended or adjusted under 35 U.S.C. 154(b) by 335 days.

(21) Appl. No.: 16/640,863

(22) PCT Filed: Nov. 30, 2017

(86) PCT No.: PCT/EP2017/080993
§ 371 (c)(1),
(2) Date: Feb. 21, 2020

(87) PCT Pub. No.: WO2019/105556
PCT Pub. Date: Jun. 6, 2019

(65) Prior Publication Data
US 2020/0248813 A1    Aug. 6, 2020

(51) Int. Cl.
*F16B 43/00* (2006.01)
*B05B 12/26* (2018.01)
(Continued)

(52) U.S. Cl.
CPC ............ *F16B 43/001* (2013.01); *B05B 12/26* (2018.02); *F01M 11/04* (2013.01);
(Continued)

(58) Field of Classification Search
CPC .... F16B 43/001; F16B 23/0007; F16B 37/14; F16B 5/0275; B05B 12/26; F01M 11/04;
(Continued)

(56) References Cited

U.S. PATENT DOCUMENTS 2,812,101 A   11/1957  Kmiecik
4,951,783 A    8/1990  Kamprath et al.
(Continued)

FOREIGN PATENT DOCUMENTS

CN   204253134 U   4/2015
CN   204402614 U   6/2015
(Continued)

OTHER PUBLICATIONS

International Preliminary Report of Patentability with Notice Application No. PCT/EP2017/080993 dated Jun. 2, 2020; dated Jun. 11, 2020 7 pages.
(Continued)

*Primary Examiner* — Jacob M Amick
*Assistant Examiner* — Charles J Brauch
(74) *Attorney, Agent, or Firm* — Whitmyer IP Group LLC (57) ABSTRACT

Seal arrangement (48) comprising a plug member (46) configured to seal a through opening (12) in a wall (10); a pressing section (74); and a cover member (70) configured to be connected to the plug member (46) and configured to force the pressing section (74) to press a sealing element (72), arranged laterally outside the plug member (46), towards the wall (10). A kit of parts and a method for sealing a through opening (12) in a wall (10) and for painting the wall (10) are also provided.

20 Claims, 7 Drawing Sheets

(51) Int. Cl.
*F01M 11/04* (2006.01)
*F16B 37/14* (2006.01)
*F16J 15/3248* (2016.01)
*F16J 15/34* (2006.01)
*F16B 23/00* (2006.01)

(52) U.S. Cl.
CPC . *F01M 11/0408* (2013.01); *F01M 2011/0416* (2013.01); *F01M 2011/0425* (2013.01); *F16B 23/0007* (2013.01); *F16B 37/14* (2013.01); *F16J 15/3248* (2013.01); *F16J 15/344* (2013.01)

(58) Field of Classification Search
CPC ....... F01M 11/0408; F01M 2011/0416; F01M 2011/0425; F16J 15/3248; F16J 15/344; F16J 13/12
See application file for complete search history.

(56) References Cited

U.S. PATENT DOCUMENTS

| | | | |
|---|---|---|---|
| 7,357,225 B2 | 4/2008 | Dorian | |
| 8,186,921 B2 | 5/2012 | Lowman | |
| 8,443,942 B2 | 5/2013 | Franz et al. | |
| 2007/0205207 A1* | 9/2007 | Dornbach | F16L 55/1152 138/89.4 |

FOREIGN PATENT DOCUMENTS

| | | |
|---|---|---|
| DE | 8702740 U1 | 6/1987 |
| EP | 0640404 A1 | 3/1995 |
| FR | 1495757 A * | 9/1967 |
| FR | 1495757 A | 9/1967 |
| JP | 2006234042 A | 9/2006 |

OTHER PUBLICATIONS

Chinese Third Office Action; Application No. 2017800952919; dated Nov. 29, 2021; 5 Pages.
Chinese Office Action; Application No. 2017800952919; dated May 7, 2021; 11 Pages.
Chinese Second Office Action; Application No. 2017800952919; dated Jul. 29, 2021; 7 Pages.
International Search Report and Written Opinion of the International Searching Authority Application No. PCT/EP2017/080993 Completed: Jul. 3, 2018; dated Jul. 11, 2018 8 pages.

* cited by examiner

Prior art

Fig. 1

Prior art

Prior art

Prior art

SEAL ARRANGEMENT, KIT OF PARTS AND METHOD

TECHNICAL FIELD

The present disclosure generally relates to seal arrangements comprising a plug member. In particular, a seal arrangement comprising a plug member and a cover member configured to be connected to the plug member, a kit of parts comprising the seal arrangement and a method for sealing a through opening in a wall and for painting the wall, are provided.

BACKGROUND

Oil plugs are used in a wide range of applications. In a gearbox for example, several oil plugs may be provided to make it possible to replace the gearbox oil. Standard oil plugs are typically mounted to the gearbox in the final assembly before the gearbox is painted. There is therefore a risk that paint flakes come off when a plug is loosened. Many prior art oil plugs also contain several potential dust pockets and do therefore not fulfill hygienic design requirements.

One solution to provide a hygienic oil plug is to use an oil plug in the form of a screw having a hexagonal screw head and a gasket pressed by the screw head. However, in order to mount this oil plug, the surface below the gasket needs to be painted before the hygienic oil plug is mounted. This may be done by mounting a smaller temporary oil plug for masking in a through opening in a wall, painting the wall, removing the smaller temporary oil plug and mounting the larger hygienic oil plug. The larger oil plug then overlaps the paint layer. However, when the smaller temporary oil plug is removed, there is a risk for oil leakage. The replacement of the temporary oil plug with the hygienic oil plug is also time consuming. It is therefore not desirable to remove an oil plug after painting.

U.S. Pat. No. 8,443,942 B2 discloses a seal arrangement for sealing a through opening in a wall of an engine component. The seal arrangement comprises an insert element for insertion into a through opening, wherein the insert element has a through channel that is closable by means of a closure element, and a sealing element for sealing between the insert element and the engine component.

SUMMARY

One object of the present disclosure is to provide a seal arrangement that enables a simple and/or fast mounting in a through opening in a wall.

A further object of the present disclosure is to provide a seal arrangement that enables an appropriate painting of the wall without removing a plug member.

A still further object of the present disclosure is to provide a seal arrangement that enables loosening of a plug member without tearing a paint layer.

A still further object of the present disclosure is to provide a seal arrangement that has a hygienic design.

A still further object of the present disclosure is to provide a seal arrangement that has a simple, reliable and/or cheap design.

A still further object of the present disclosure is to provide a kit of parts solving one, several or all of the foregoing objects.

A still further object of the present disclosure is to provide a method for sealing a through opening in a wall and for painting the wall solving one, several or all of the foregoing objects.

According to one aspect, there is provided a seal arrangement comprising a plug member configured to seal a through opening in a wall; a pressing section; and a cover member configured to be connected to the plug member and configured to force the pressing section to press a sealing element, arranged laterally outside the plug member, towards the wall.

The plug member may thus be configured to seal the through opening alone (i.e. without the cover member). The wall can thereby be painted while the plug member seals the through opening. This eliminates the need of replacing the plug member after painting. During painting, the plug member may be covered by a masking cover to define a painted area on the wall adjacent to the masking cover and a non-painted area on the wall adjacent to the plug member, laterally within the masking cover.

After completion of the painting, the cover member may be connected to the plug member to press the sealing element (by means of the pressing section) in order to provide a hygienic seal. The plug member can then also be released by manipulating the cover member, e.g. by means of a socket. The seal arrangement thus provides a hygienic assembly without removing the plug member after painting. The risk for oil leakage after painting is thus eliminated and the total assembly time is shortened. Examples of hygienic environments in which the seal arrangement according to the present disclosure may be used include environments in which food and/or pharmaceuticals are handled, e.g. by means of one or more robots.

Throughout the present disclosure, the plug member may be constituted by a drain plug for draining oil by means of gravity. The seal arrangement according to the present disclosure may alternatively be referred to as a hygienic oil plug arrangement.

The plug member according to the present disclosure may comprise a plug member step for mating with the wall when the plug member seals the through opening. In this case, the sealing element may be arranged laterally outside the plug member step. The plug member step according to the present disclosure may be designed in various ways. The plug member step may comprise a surface having a normal substantially parallel with, or parallel with, a longitudinal axis of the plug member, for example a surface extending between a relatively larger outer circumference of a plug member head and a relatively smaller outer circumference of a shaft of the plug member (e.g. comprising a male thread). The normal of the surface of the plug member step may also be substantially parallel with, or parallel with, a normal of the wall comprising the through opening. The plug member step may also be formed by a plug member flange or plug member collar.

Throughout the present disclosure, the cover member may alternatively be referred to as a protection member. The seal arrangement according to the present disclosure may seal the through opening against various types of mediums, for example oil, lubrication mediums other than oil, water, air and other mediums.

The plug member may comprise a substantially flat plug member surface and the cover member may comprise a substantially flat cover member surface. In this case, the plug member surface and the cover member surface may be configured to mate when the cover member is connected to the plug member. For example, in case the plug member and the cover member are vertically oriented such that a longitudinal axis concentric with the plug member and the cover member is vertical and the cover member is positioned above the plug member, the plug member surface may be constituted by an upwardly facing lower surface and the cover member surface may be constituted by a downwardly facing upper surface.

The pressing section and the cover member may be integrally formed, i.e. from the same piece of material. In this case, the pressing section may be constituted by a section of the cover member facing the sealing element. Alternatively, the pressing section may be connected, directly or indirectly, to the cover member. In both cases, the cover member is considered to comprise the pressing section. Alternatively, the pressing section may be constituted by a separate component. In any case, the pressing section may for example be constituted by, or formed by, a flange, disc, step, washer or collar.

The cover member and the plug member may be configured to be connected by an interference fit, such as a shrink fit or a press fit. Alternatively, the cover member and the plug member may be configured to be connected by a screw thread connection. The cover member may for example be constituted by a cover screw for being screwed into the plug member. Alternatively, or in addition, the cover member and the plug member may be connected by an adhesive.

The cover member may comprise a male profile and the plug member may comprise a female profile for receiving the male profile in order to connect the cover member to the plug member. For example, the female profile of the plug member may be constituted by an opening with an internal thread and the male profile of the cover member may be constituted by an external thread of a screw. The reverse variant is also possible, i.e. the plug member may comprise the male profile and the cover member may comprise the female profile. Also in this reverse variant, the cover member may threadingly engage the plug member. An interference fit may alternatively be employed for each of the two variants.

The seal arrangement may further comprise a sealing element configured to be arranged laterally outside the plug member and configured to be pressed by the pressing section towards the wall. The sealing element may for example be constituted by an O-ring or a gasket. In an unloaded state, the sealing element may have a thickness larger than the thickness of the plug member step (or larger than the length of a part of the plug member that protrudes from the outer surface of the wall). Thus, when for example the cover member surface mates with the plug member surface, the sealing element adopts a compressed state. This mating enables a controlled compression of the sealing element. Examples of material of the sealing element include cork, rubber, soft metal and other types of deformable material.

The sealing element may be connected to the pressing section. Alternatively, the sealing element may be a separate component.

The plug member may comprise a male thread for threadingly engaging a female thread of the through opening. The seal arrangement may also further comprise an O-ring or similar sealing member for sealing a radial gap between the plug member and the through opening. A radial groove may be machined in the plug member and/or in the through opening in which the O-ring or the similar sealing member can be seated to act as a seal.

The cover member may comprise a multisided head, such as a hexagonal head, for being engaged by a socket in order to loosen the plug member by engaging the head of the cover member when the cover member is connected to the plug member. Thus, the connection between the cover member and the plug member may be stronger than the connection between the plug member and the through opening. Except for the multisided head, the cover member may have a smooth exterior profile, i.e. a hygienic design.

The seal arrangement according to the present disclosure may be used in various types of applications where a volume of oil (or other medium) is closed by a wall having a through opening. Examples of applications include industrial robots, gearboxes of industrial robots, other types of gearboxes, motors, such as electric motors, engines, such as combustion engines, catch trays and tanks.

According to one example, the wall comprising the through opening may be a lower wall, such as a bottom wall, of an enclosure containing a volume of lubricating medium. As an alternative example, the wall comprising the through opening may be a side wall and the through opening may be arranged in a lower region of the side wall.

According to a further aspect, there is provided a kit of parts comprising a seal arrangement according to the present disclosure and a masking cover configured to cover the plug member. The masking cover may be of various types. Examples of masking covers may be a plate or a lid, e.g. of plastic. The masking cover may comprise a flat portion having a size substantially corresponding to, or corresponding to, the upper plug member surface (in case the plug member is mounted downwards). The flat portion of the masking cover may be circular, or substantially circular. The masking cover may further comprise a side wall having a height substantially corresponding to, or corresponding to, the height of the plug member step (or to the length of a part of the plug member that protrudes from the outer surface of the wall). In other words, the masking cover may be constituted by a flat cylinder having one closed side. The masking cover can both be in contact with the (upper) plug member surface and the wall when the masking cover protects the plug member. The masking cover may be made of an elastic material such that the masking cover can be releasably fastened to the plug member by exerting a radially inward force on the plug member.

The kit of parts may further comprise a sealing element according to the present disclosure configured to be arranged laterally outside the plug member and to enclose the plug member, wherein the sealing element has a larger lateral extension than the masking cover. The masking cover may define a non-painted area on the wall adjacent to the plug member. Since the sealing element has a larger lateral extension than the masking cover, the sealing element overlaps the painted area on the wall adjacent to the plug member and thereby provides a tight seal.

According to a further aspect, there is provided a method for sealing a through opening in a wall and for painting the wall, the method comprising sealing the through opening with a plug member; covering the plug member with a masking cover; painting the wall adjacent to the masking cover to create a painted area; removing the masking cover; and connecting a cover member to the plug member, while the plug member seals the through opening, such that the plug member can be loosened by manipulating the cover member. The method may further comprise arranging a sealing element laterally outside the plug member to cover a part of the painted area. In this case, the sealing element may be arranged laterally outside a plug member step of the plug member.

The method may further comprise forcing a pressing section, by means of the cover member, to press the sealing element towards the wall. The plug member, the plug member step, the masking cover, the cover member, the pressing section and the sealing element of the method may each be of any type according to the present disclosure.

As used herein, a substantially perpendicular/parallel relationship includes a perfectly perpendicular/parallel relationship as well as deviations from a perfectly perpendicular/parallel relationship with up to 5%, such as up to 2%. A radial direction and a lateral direction each refers to a direction perpendicular to a longitudinal axis of the plug member, the cover member and/or the through opening.

BRIEF DESCRIPTION OF THE DRAWINGS

Further details, advantages and aspects of the present disclosure will become apparent from the following embodiments taken in conjunction with the drawings, wherein:

FIG. 2b: schematically represents an enlarged view of section A in FIG. 2a;

FIG. 7b: schematically represents a cross sectional side view of the seal arrangement in FIGS. 6 and 7a.

DETAILED DESCRIPTION

In the following, a seal arrangement comprising a plug member and a cover member configured to be connected to the plug member, a kit of parts comprising the seal arrangement and a method for sealing a through opening in a wall and for painting the wall, will be described. The same reference numerals will be used to denote the same or similar structural features.

Figure 1:
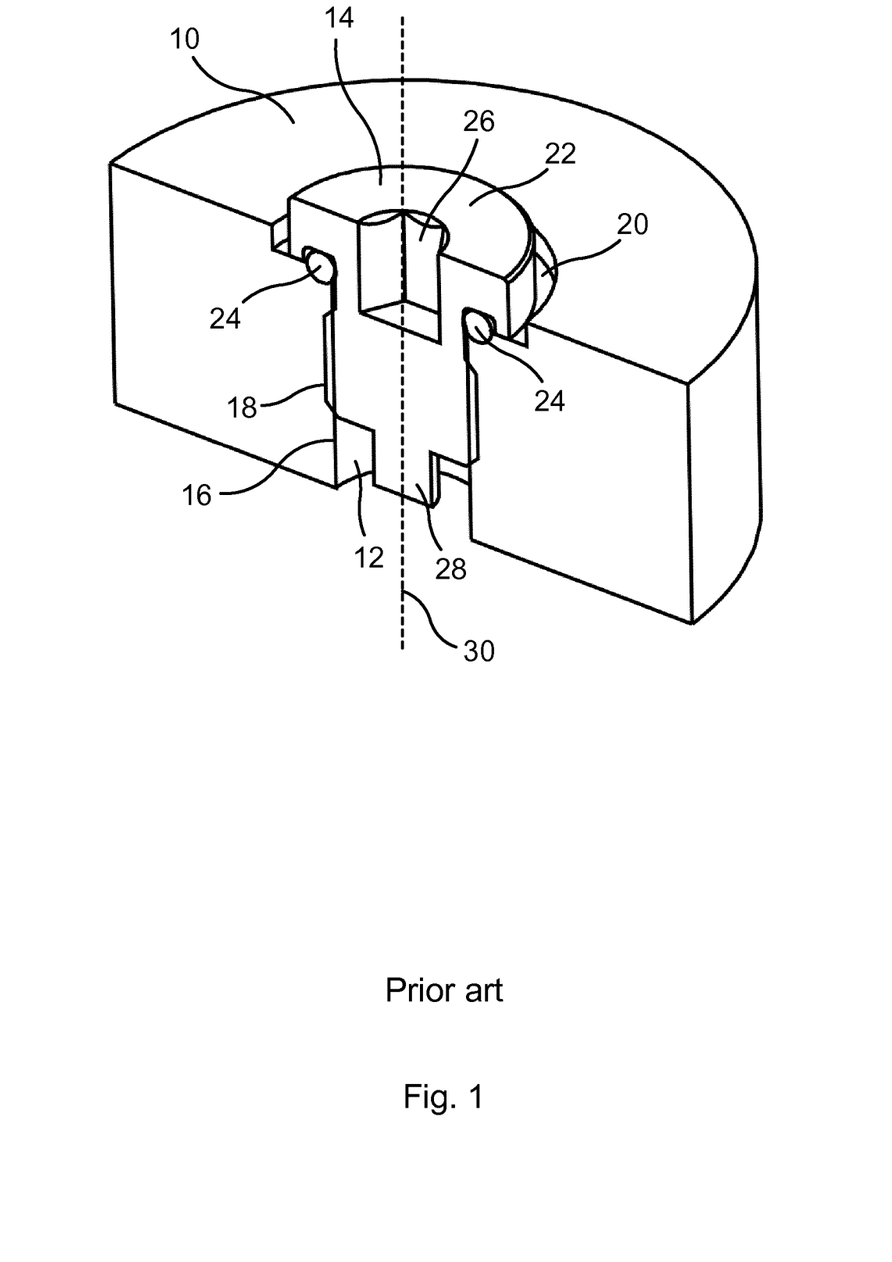
FIG. 1: schematically represents a cross sectional perspective view of a wall having a through opening and an oil plug according to the prior art.

FIG. 1 schematically represents a cross sectional perspective view of a wall to having a through hole or through opening 12 and an oil plug 14 according to the prior art. In FIG. 1, the upper surface of the wall to is an exterior surface and the lower surface of the wall to is an interior surface. The through opening 12 comprises a female thread 16. The oil plug 14 comprises a male thread 18 for threadingly engaging the female thread 16.

A recess or aperture 20 is arranged in the wall to such that the through opening 12 is countersunk. A plug head 22 of the oil plug 14 is seated in the aperture 20. The oil plug 14 further comprises an O-ring 24 below the plug head 22 and a hexagonal recess 26 for being engaged by a tool in order to mount or dismount the oil plug 14. FIG. 1 further shows that the oil plug 14 comprises a magnet 28 for absorbing smaller magnetic constituents of the oil, and a longitudinal axis 30 of the through opening 12 (and of the oil plug 14 when inserted into the through opening 12).

If the wall to for example is constituted by a wall of a gearbox, one or more oil plugs 14 according to FIG. 1 are typically mounted in the final assembly before the gearbox is painted. Thus, a paint layer overlaps the interface between the aperture 20 of the wall to and the plug head 22. When the oil plug 14 is loosened, there is therefore a risk that paint flakes come off. The design of the oil plug 14 in FIG. 1 also comprises several potential dust pockets, such as the hexagonal recess 26 and the aperture 20, which makes the oil plug 14 less suitable for hygienic applications.

Figure 2A:
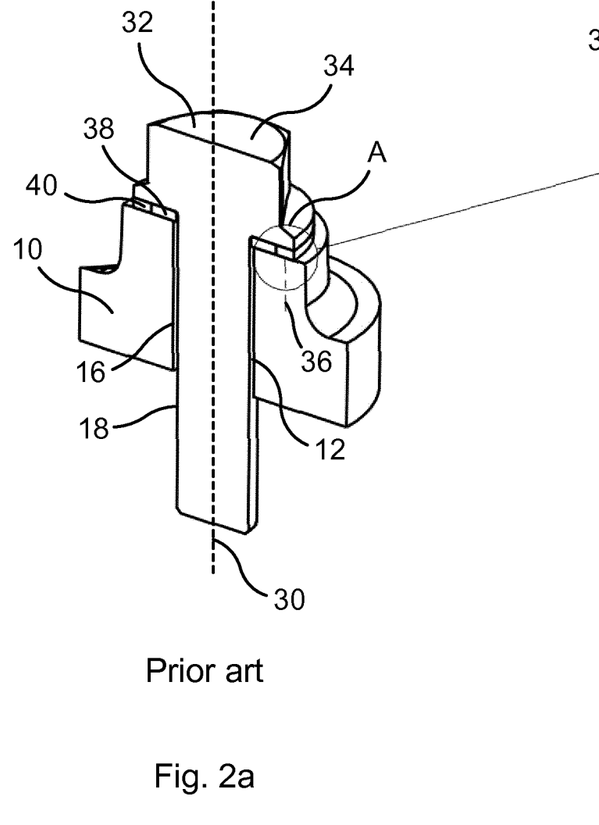
FIG. 2a: schematically represents a cross sectional perspective view of a wall having a through opening and a screw according to the prior art.
Figure 2B:
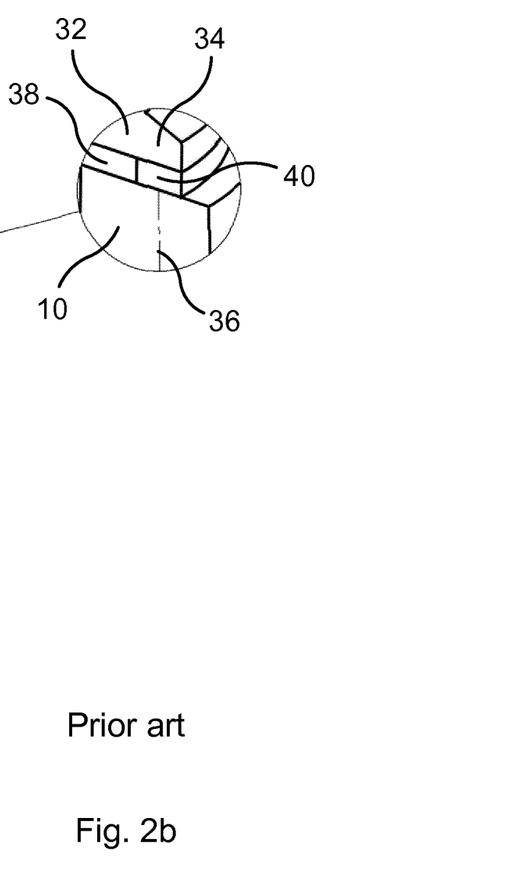

FIG. 2a schematically represents a cross sectional perspective view of a wall to having a through opening 12 and a screw 32 according to the prior art forming a screw joint. FIG. 2b schematically represents an enlarged view of section A in FIG. 2a. In FIG. 2a, the upper surface of the wall to is an exterior surface, and the lower surface of the wall to is an interior surface.

With collective reference to FIGS. 2a and 2b, the through opening 12 comprises a female thread 16. The screw 32 comprises a male thread 18 for threadingly engaging the female thread 16 and a hexagonal screw head 34.

In order to paint the screw 32 and the wall to in FIGS. 2a and 2b, a first relatively larger washer (not shown) is placed between the screw head 34 and the wall to. The larger washer has a radial extension (perpendicular to a longitudinal axis 30 of the screw 32) up to a line 36 and a painted area (radially outside the line 36) is thereby defined. After painting, the screw 32 is removed and the relatively larger washer is replaced by a relatively smaller washer 38 that has an outer end radially inside of the line 36, and a gasket 40 that radially overlaps the line 36. The gasket 40 thereby overlaps the painted area. Thus, the screw 32 needs to be removed in connection with the painting process which is burdensome and associated with the risk for oil leakage.

Figure 3:
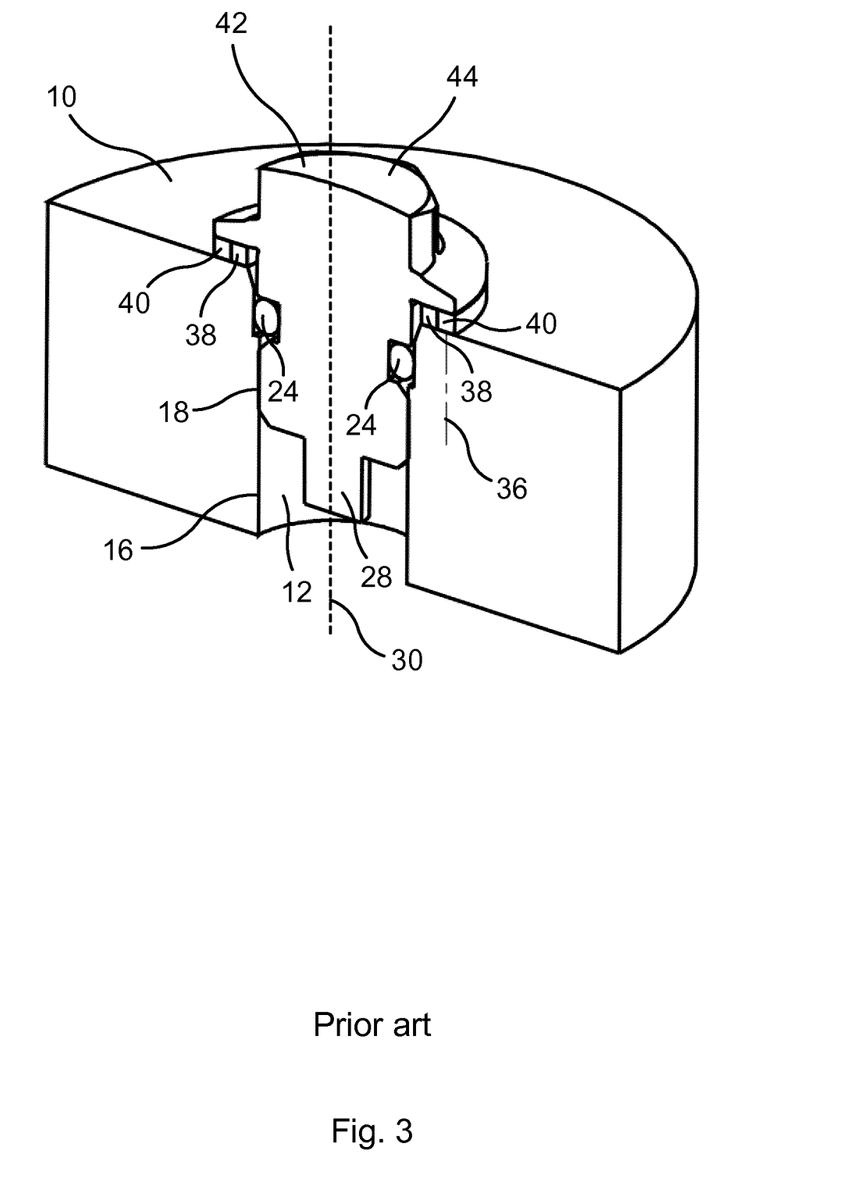
FIG. 3: schematically represents a cross sectional perspective view of a wall having a through opening and a hygienic oil plug according to the prior art.

FIG. 3 schematically represents a cross sectional perspective view of a wall to having a through opening 12 and a hygienic oil plug 42 according to the prior art. In FIG. 3, the upper surface of the wall to is an exterior surface and the lower surface of the wall to is an interior surface. The through opening 12 comprises a female thread 16. The oil plug 42 comprises a male thread 18 for threadingly engaging the female thread 16, and a hexagonal plug head 44.

In order to paint the oil plug 42 and the wall to in FIG. 3, a smaller temporary oil plug (not shown) is typically mounted in the through opening 12. The temporary oil plug has a radial extension up to the line 36 and a painted area is thereby defined. After painting, the temporary oil plug is removed and replaced by the oil plug 42. A washer 38, radially inside the line 36, and a gasket 4o, radially overlapping the line 36, are positioned between the plug head 44 and the wall 10. When the smaller temporary oil plug is removed, there is a risk for oil leakage. The replacement of the temporary oil plug with the oil plug 42 is also time consuming.

Figure 4:
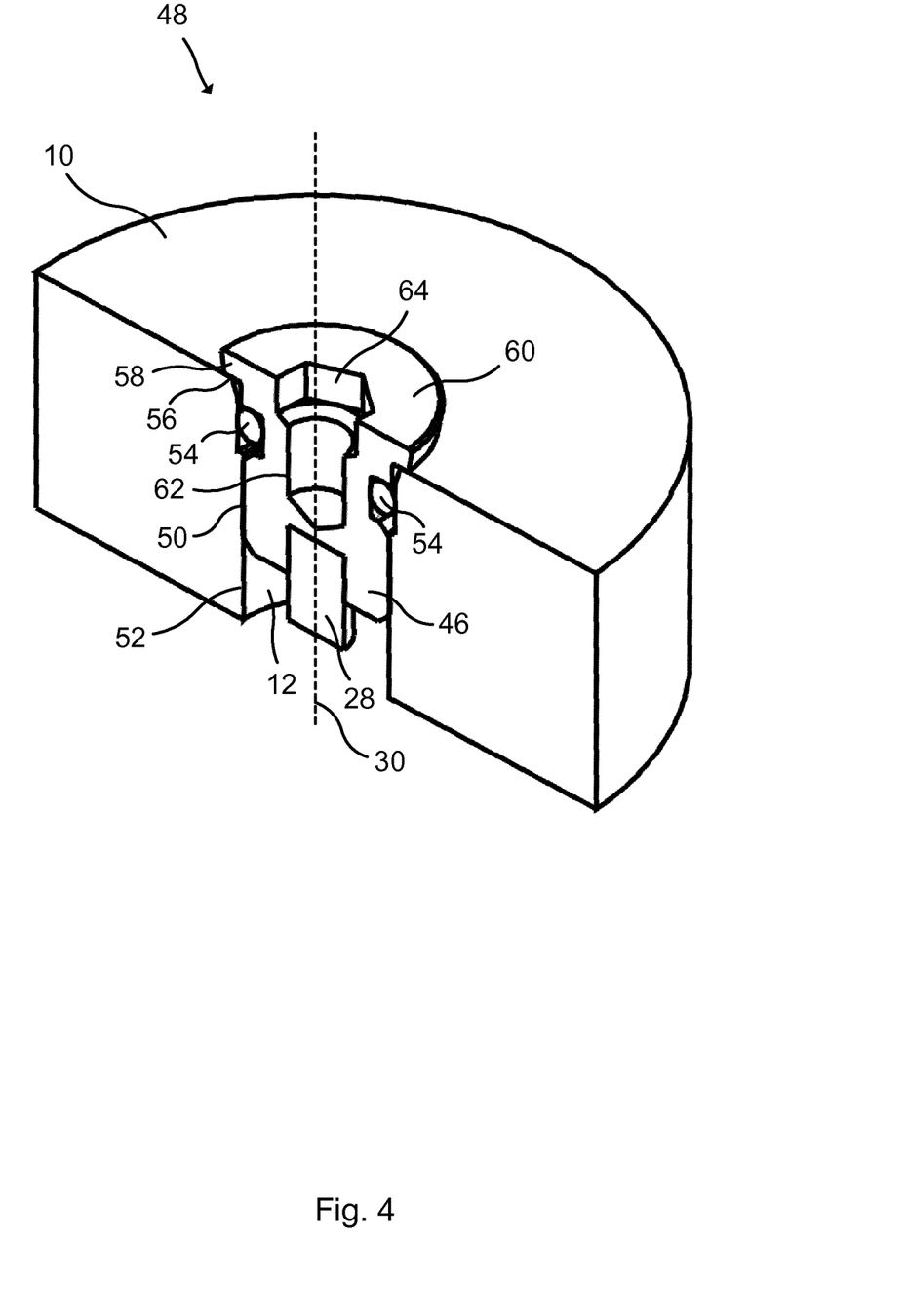
FIG. 4: schematically represents a cross sectional perspective view of a wall having a through opening and a plug member of a seal arrangement according to the present disclosure.

FIG. 4 schematically represents a cross sectional perspective view of a wall 10 having a through opening 12 and a plug member 46 of a seal arrangement 48 according to the present disclosure. In FIG. 4, the upper surface of the wall 10 is an exterior surface and the lower surface of the wall 10 is an interior surface, for example of a gearbox housing containing oil or other lubricating medium.

The plug member 46 may be of various types to seal the through opening 12 alone. In the example of FIG. 4, the plug member 46 comprises a male thread 5o for threadingly engaging a female thread 52 of the through opening 12. The seal arrangement 48 comprises a sealing member 54, here implemented as an O-ring, for creating a seal between the plug member 46 and the wall 10. Other types of seals may however be employed in order for the plug member 46 to seal the through opening 12.

The plug member 46 of this example comprises a plug member step 56. The plug member step 56 is constituted by a flat surface having a normal substantially parallel with the longitudinal axis 30 of the plug member 46. The plug member step 56 is formed by an upper (upper in FIG. 4) collar 58 of the plug member 46. The plug member step 56 mates with the exterior surface of the wall 10 in the illustrated mounted and sealed state of the plug member 46.

The plug member 46 further comprises a substantially flat plug member surface 60. The plug member surface 60 of this example comprises a normal substantially parallel with the longitudinal axis 30 of the plug member 46.

The plug member 46 further comprises a female profile 62, here exemplified as a blind opening into the plug member 46. At an entrance side of the female profile 62, a multisided recess 64, such as a hexagonal recess, is arranged for being engaged by a tool (not shown).

The plug member 46 in FIG. 4 is further illustrated as comprising a magnet 28 at an interior side of the plug member 46, opposite to the plug member surface 60. The magnet 28 can function to absorb magnetic fragments in the lubricating medium. The magnet 28 is however optional and may be omitted.

A method for sealing the through opening 12 in the wall to and for painting the wall to according to the present disclosure may comprise sealing the through opening 12 with the plug member 46 as a first step.

Figure 5:
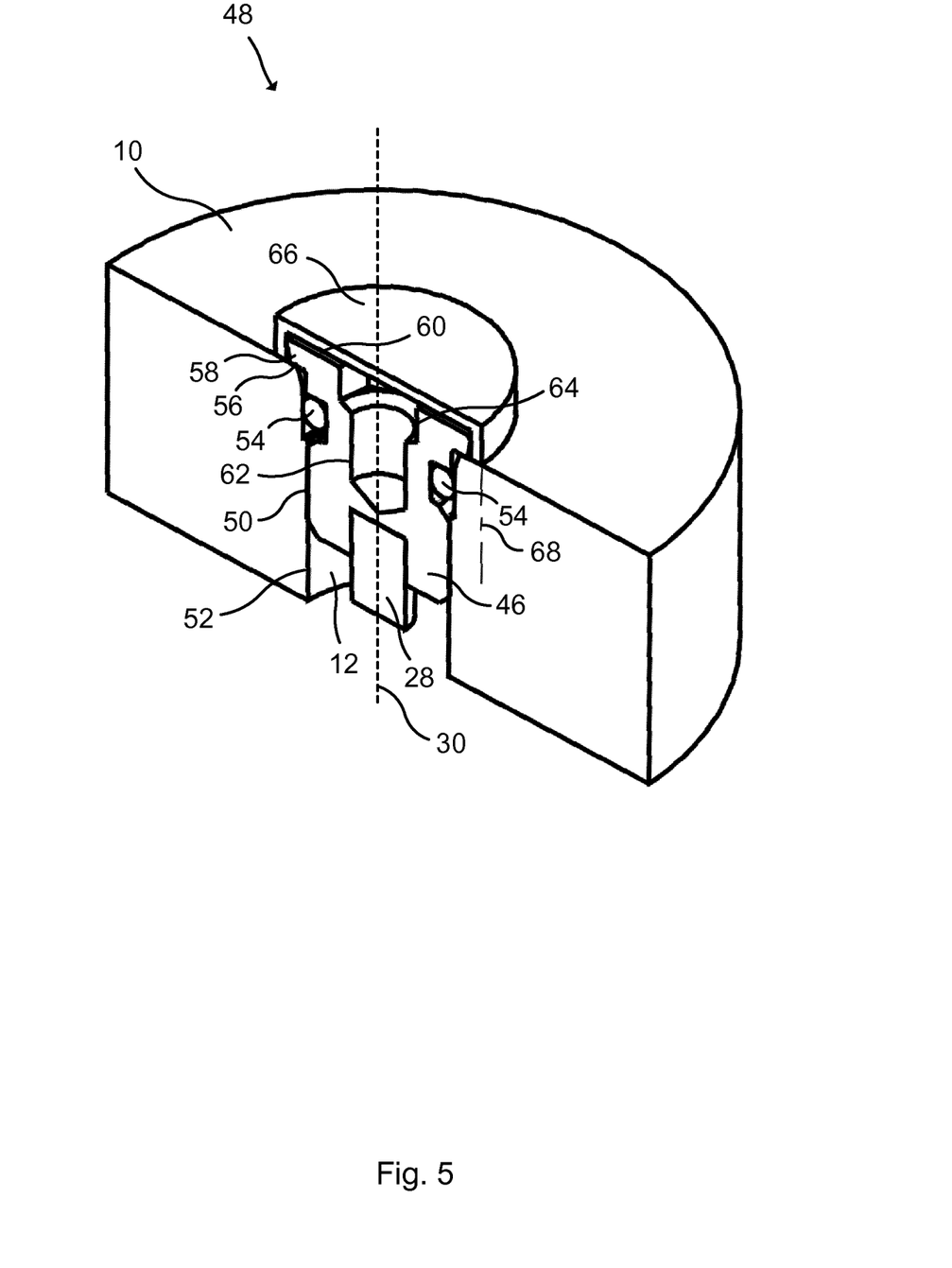
FIG. 5: schematically represents the view of FIG. 4 and a masking cover covering the plug member.

FIG. 5 schematically represents the view of FIG. 4 and one example of a masking cover 66 covering the plug member 46. The masking cover 66 is configured to cover the plug member 46. The masking cover 66 defines a non-painted area on the wall to adjacent to the plug member 46, radially inside (with respect to the longitudinal axis 30) a line 68, and a painted area on the wall to adjacent to the masking cover 66, radially outside the line 68 in a controlled manner.

In FIG. 5, the masking cover 66 is exemplified as a lid comprising a flat circular upper portion and a side wall. The area of the upper portion of the masking cover 66 substantially corresponds to the area of the plug member surface 60 such that the side wall of the masking cover 66 is tightly fitted around the collar 58 of the plug member 46. The side wall of the masking cover 66 also mates with the exterior surface of the wall to in the illustrated mounted state of the masking cover 66. The masking cover 66 may be attached to and detached from the plug member 46 by hand.

The method for sealing the through opening 12 in the wall to and for painting the wall to according to the present disclosure may further comprise covering the plug member 46 with the masking cover 66 as a further step. The method may further comprise painting the wall to adjacent to the masking cover 66 (possibly also the masking cover 66) as a further step. The method may further comprise removing the masking cover 66 as a further step. The step of removing the masking cover 66 may be performed before the paint has dried. After removal, the masking cover 66 may be discarded.

Figure 6:
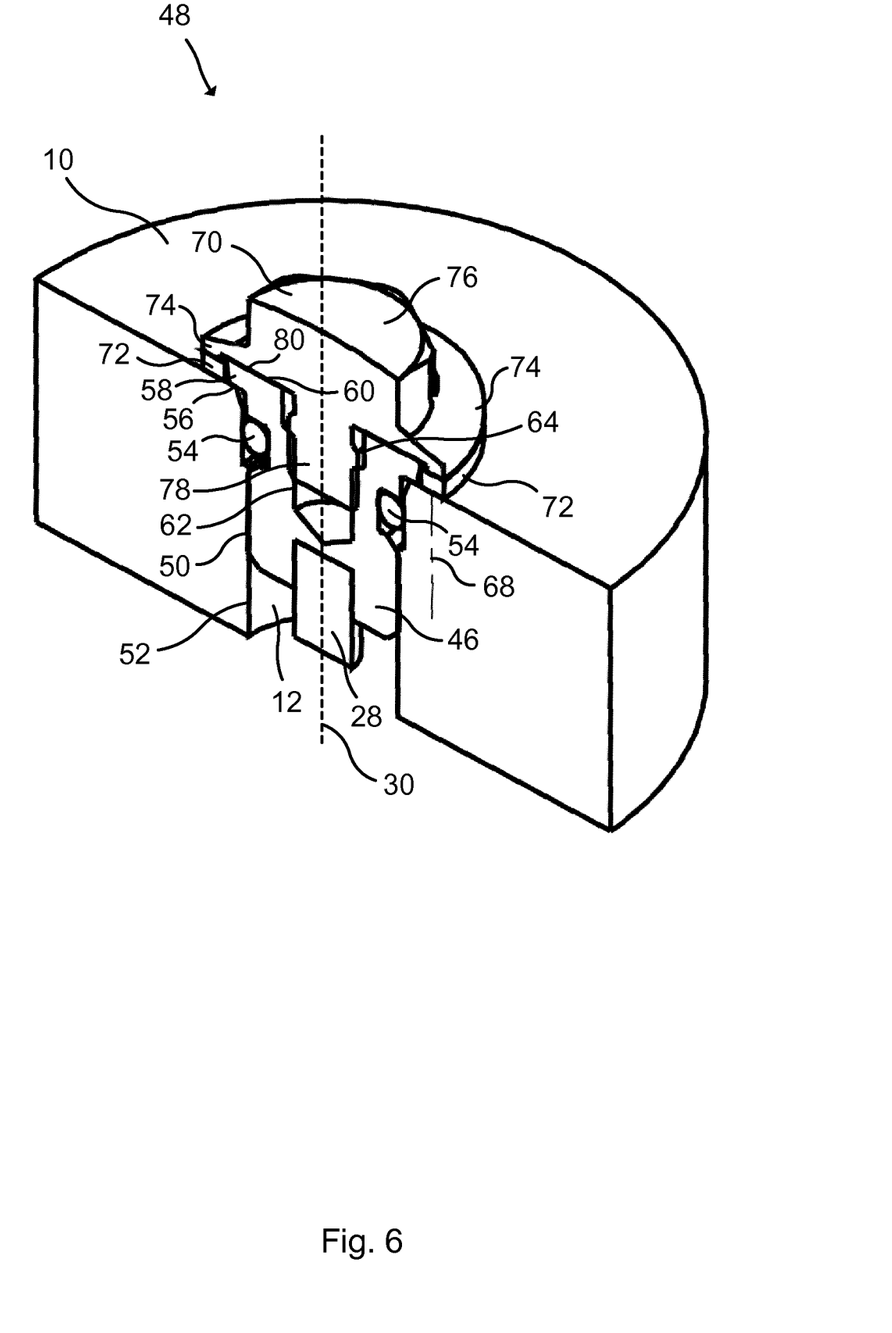
FIG. 6: schematically represents the view of FIG. 4 and a cover member of the seal arrangement connected to the plug member.
Figure 7A:
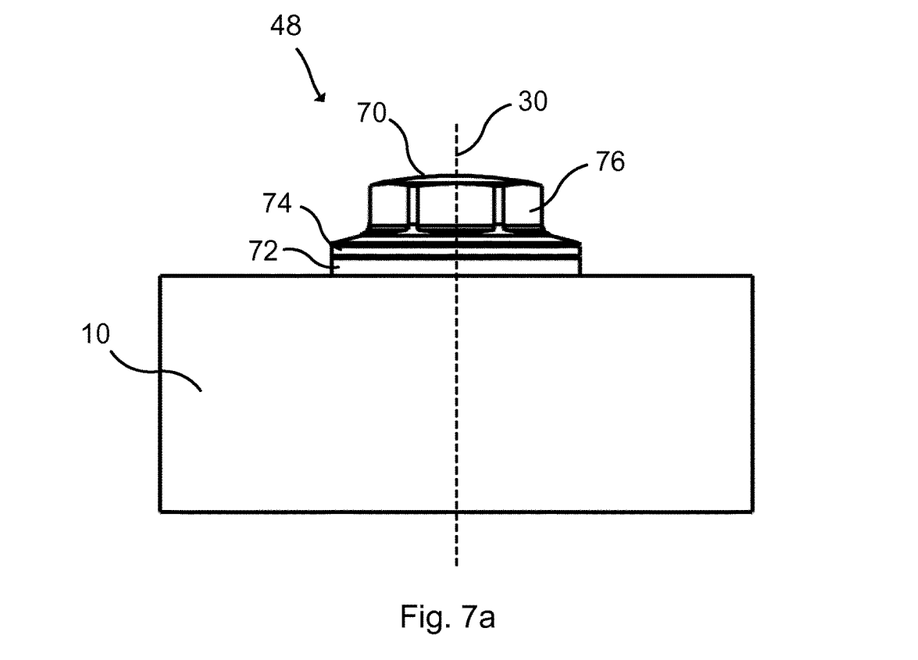
FIG. 7a: schematically represents a side view of the seal arrangement in FIG. 6.
Figure 7B:
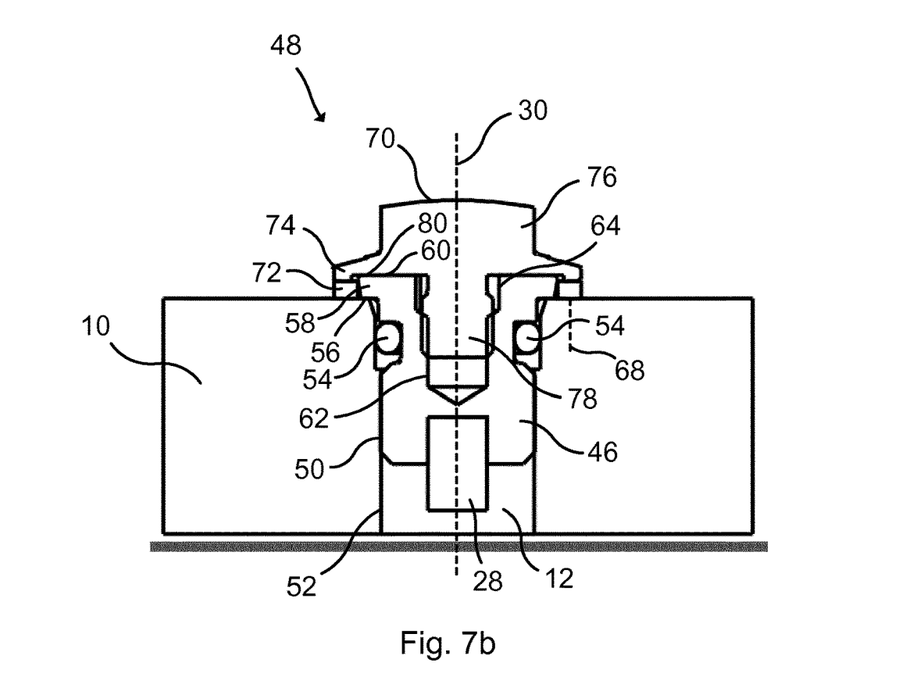

FIG. 6 schematically represents the view of FIG. 4 and a cover member 70 of the seal arrangement 48 connected to the plug member 46. FIG. 7a schematically represents a side view of the seal arrangement 48 in FIG. 6. FIG. 7b schematically represents a cross sectional side view of the seal arrangement 48 in FIGS. 6 and 7a.

The seal arrangement 48 of the example in FIGS. 6, 7a and 7b further comprises a sealing element 72. After removal of the masking cover 66, the sealing element 72 is positioned around the plug member step 56 (and around the collar 58) to cover a part of the painted area. As can be seen in FIGS. 6 and 7b, the sealing element 72 covers both a part of the painted area, laterally outside the line 68, and a part of the non-painted area, laterally inside the line 68. The method for sealing the through opening 12 in the wall 10 and for painting the wall 10 according to the present disclosure may thus further comprise arranging the sealing element 72 laterally outside the plug member step 56 to cover a part of the painted area (laterally outside the line 68).

With collective reference to FIGS. 6, 7a and 7b, the seal arrangement 48 further comprises a pressing section 74. In this example, the pressing section 74 is integrally formed with the cover member 70. More specifically, the pressing section 74 is constituted by a flange of the cover member 70.

The cover member 70 of this example comprises a head 76 and a male profile 78. In FIGS. 6, 7a and 7b, the male profile 78 of the cover member 70 has been press fitted into the female profile 62 of the plug member 46 to provide an interference fit between the cover member 70 and the plug member 46. The head 76 is multisided (hexagonal in FIGS. 6, 7a, 7b) for being engaged by a tool (not shown). The cover member 70 and the plug member 46, which is connected to the cover member 70, can thereby be screwed out from the through opening 12 by engaging the cover member 70.

Instead of an interference fit, the cover member 70 may be threadingly connected to the plug member 46. For example, a female thread may be provided on the female profile 62 of the plug member 46 and a corresponding male thread may be provided on the male profile 78 of the cover member 70.

The method for sealing the through opening 12 in the wall 10 and for painting the wall 10 according to the present disclosure may thus further comprise connecting the cover member 70 to the plug member 46, while the plug member 46 seals the through opening 12, such that the plug member 46 can be loosened by manipulating the cover member 70, as a further step.

The sealing element 72 is in this example connected to the pressing section 74 but may alternatively be constituted by a separate component. The sealing element 72 is arranged laterally outside the plug member step 56. As can be seen in FIGS. 6, 7a and 7b, the radially outer sides of the pressing section 74 and the sealing element 72 are also flush around the circumference of the cover member 70. FIGS. 6, 7a and 7b also show that the cover member 70 and the sealing element 72 have a smooth exterior profile (except for the multisided head 76). Consequently, a hygienic design is provided which for example is suitable for food and pharmaceutic applications.

When the cover member 70 is connected to the plug member 46, the pressing section 74 of the cover member 70 presses the sealing element 72 against the exterior surface of the wall 10. Thereby, a tight seal is established.

The cover member 70 comprises a flat cover member surface 80. In the mounted state of the cover member 70, the cover member surface 80 comprises a normal substantially parallel with the longitudinal axis 30. When the cover member 70 is connected to the plug member 46, the plug member surface 60 and the cover member surface 80 are mated. The lower part (lower in FIGS. 6, 7a and 7b) of the pressing section 74 is arranged below the plug member surface 60. These parts may however be flush (i.e. positioned at the same point along the longitudinal axis 30).

Alternatively, or in addition, an adhesive may be used for connecting the cover member 70 to the plug member 46.

The present disclosure also provides for a kit of parts comprising the masking cover 66 and the seal arrangement 48 comprising at least the plug member 46 and the cover member 70. The kit of parts may also comprise the sealing element 72. The components of the kit of parts may for example be sold and/or stored together. All components of one kit of parts may be color coded (prior to painting) in order to further facilitate the assembly and painting.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A seal arrangement comprising:
a plug member configured to seal a through opening in a wall, the plug member having a body that is configured to completely occupy a perimeter of the through opening;
a pressing section; and
a cover member configured to be connectable to the plug member and configured to force the pressing section to press a sealing element, arranged laterally outside the plug member, towards the wall.

2. The seal arrangement according to claim 1, wherein the plug member comprises a substantially flat plug member surface and the cover member comprises a substantially flat cover member surface and wherein the plug member surface and the cover member surface are configured to mate when the cover member is connected to the plug member.

3. The seal arrangement according to claim 1, wherein the pressing section and the cover member are integrally formed.

4. The seal arrangement according to claim 1, wherein the pressing section and the cover member are connected to each other or are constituted by separate components.

5. The seal arrangement according to claim 1, wherein the cover member and the plug member are configured to be connectable by an interference fit.

6. The seal arrangement according to claim 1, wherein the cover member and the plug member are configured to be connectable by a screw thread connection.

7. The seal arrangement according to claim 1, wherein the cover member comprises a male profile and wherein the plug member comprises a female profile for receiving the male profile in order to connect the cover member to the plug member.

8. The seal arrangement according to claim 1, further comprising a sealing element configured to be arranged laterally outside the plug member and configured to be pressed by the pressing section towards the wall.

9. The seal arrangement according to claim 8, wherein the sealing element is connected to the pressing section.

10. The seal arrangement according to claim 1, wherein the plug member comprises a male thread for engaging a female thread of the through opening.

11. The seal arrangement according to claim 1, wherein the cover member includes a multisided head for being engaged by a socket in order to loosen the plug member by engaging the head when the cover member is connected to the plug member.

12. A kit of parts comprising:
a seal arrangement including:
a plug member configured to seal a through opening in a wall, the plug member having a body that is configured to completely occupy a perimeter of the through opening;
a pressing section; and
a cover member configured to be connectable to the plug member and configured to force the pressing section to press a sealing element, arranged laterally outside the plug member, towards the wall; and
a masking cover configured to cover the plug member.

13. The kit of parts according to claim 12, further comprising a sealing element configured to be arranged laterally outside the plug member and to enclose the plug member, wherein the sealing element has a larger lateral extension than the masking cover.

14. A method for sealing a through opening in a wall and for painting the wall, the method comprising:
sealing the through opening with a plug member having a body that is configured to completely occupy a perimeter of the through opening;
covering the plug member with a masking cover;
painting the wall adjacent to the masking cover to create a painted area;
removing the masking cover; and
connecting a cover member to the plug member, while the plug member seals the through opening, such that the plug member can be loosened by manipulating the cover member.

15. The method according to claim 14, wherein the method further comprises arranging a sealing element laterally outside the plug member to cover a part of the painted area.

16. The seal arrangement according to claim 2, wherein the pressing section and the cover member are integrally formed.

17. The seal arrangement according to claim 2, wherein the pressing section and the cover member are connected to each other or are constituted by separate components.

18. The seal arrangement according to claim 2, wherein the cover member and the plug member are configured to be connectable by a screw thread connection.

19. The seal arrangement according to claim 5, wherein the interference fit is a shrink fit or a press fit.

20. The seal arrangement according to claim 11, wherein the multisided head is a hexagonal head.

* * * * *